(12) United States Patent
Higuchi et al.

(10) Patent No.: US 8,139,692 B2
(45) Date of Patent: Mar. 20, 2012

(54) CODE EVALUATOR, CODE EVALUATION METHOD, RADIO COMMUNICATION SYSTEM, BASE STATION AND MOBILE STATION

(75) Inventors: Kenichi Higuchi, Yokohama (JP); Teruo Kawamura, Yokosuka (JP); Mamoru Sawahashi, Yokohama (JP); Xiaoming Dai, Beijing (CN); Yong Bai, Beijing (CN); Lan Chen, Beijing (CN)

(73) Assignee: NTT DoCoMo, Inc., Tokyo (JP)

(*) Notice: Subject to any disclaimer, the term of this patent is extended or adjusted under 35 U.S.C. 154(b) by 644 days.

(21) Appl. No.: 12/293,502

(22) PCT Filed: Mar. 19, 2007

(86) PCT No.: PCT/JP2007/055575
§ 371 (c)(1),
(2), (4) Date: Feb. 19, 2009

(87) PCT Pub. No.: WO2007/108452
PCT Pub. Date: Sep. 27, 2007

(65) Prior Publication Data
US 2009/0290627 A1    Nov. 26, 2009

(30) Foreign Application Priority Data
Mar. 20, 2006  (JP) ................................ 2006-077815

(51) Int. Cl.
*H04L 27/06* (2006.01)
(52) U.S. Cl. ........................................................ 375/343
(58) Field of Classification Search ................... 375/142, 375/150, 343
See application file for complete search history.

(56) References Cited

U.S. PATENT DOCUMENTS

| 5,940,433 | A | 8/1999 | Sawahashi et al. |
| 6,078,788 | A * | 6/2000 | Haardt ........................... 455/65 |
| 6,639,902 | B2 | 10/2003 | Mennekens et al. |
| 2006/0071696 | A1* | 4/2006 | Lee ............................... 327/158 |

FOREIGN PATENT DOCUMENTS

| JP | 11-112466 A | 4/1999 |
| JP | 2003-318704 A | 11/2003 |

OTHER PUBLICATIONS

David C. Chu, "Polyphase Codes With Good Periodic Correlation Properties," IEEE Trans. Inform. Theory, vol. 18, No. 4, pp. 531-532, Jul. 1972, 2 pages.
Marvin N. Cohen, et al., "Minimum peak sidelobe pulse compression codes," Proc. IEEE Int. Radar Conf. pp. 633-638, 1990, 6 pages.
Xiaoming Dai, Yong Bai and Lan Chen, "New Approach to Code Generation for Wide-band Wireless Communications Systems," The Institute of Electronics, IEICE Technical Report, vol. 105, RCS2005-215, pp. 223-227, Mar. 2006, 5 pages.

(Continued)

*Primary Examiner* — Don N Vo
(74) *Attorney, Agent, or Firm* — Osha • Liang LLP (57) ABSTRACT

The present invention relates to a code evaluation method comprising the steps of computing an auto-correlation function from a generated code; computing an evaluation reference value for determining quality of the generated code based on the auto-correlation function and a weighting factor determined depending on the evaluation reference value; and determining the quality of the generated code based on the evaluation reference value.

14 Claims, 11 Drawing Sheets

OTHER PUBLICATIONS

International Search Report w/translation from PCT/JP2007/055575 dated May 15, 2007 (3 pages).
Written Opinion from PCT/JP2007/055575 dated May 15, 2007 (3 pages).
Golay, M.J.E.; "Sieves for Low Autocorrelation Binary Sequences"; IEEE Transactions on Information Theory, vol. IT-23, No. 1; pp. 43-51, Jan. 1997 (9 pages).
Taiwanese Office Action for Patent Application No. 096109554, mailed on Jul. 27, 2010 (5 pages).

* cited by examiner

FIG.4
PRIOR ART off-peak chip index:   0 1 2 3 4 5 6 7 8

ACF of code 1:   | 9 0 0 0 0 4 3 2 1 |

ACF of code 2:   | 9 4 3 2 1 0 0 0 0 |

CODE EVALUATOR, CODE EVALUATION METHOD, RADIO COMMUNICATION SYSTEM, BASE STATION AND MOBILE STATION

TECHNICAL FIELD

The present invention relates to code evaluators and code evaluation methods for evaluating codes for use in data transmission, synchronization and channel estimation as well as radio communication systems, base stations and mobile stations where code sequences selected based on the code evaluation methods are used.

BACKGROUND ART

Figure 1:
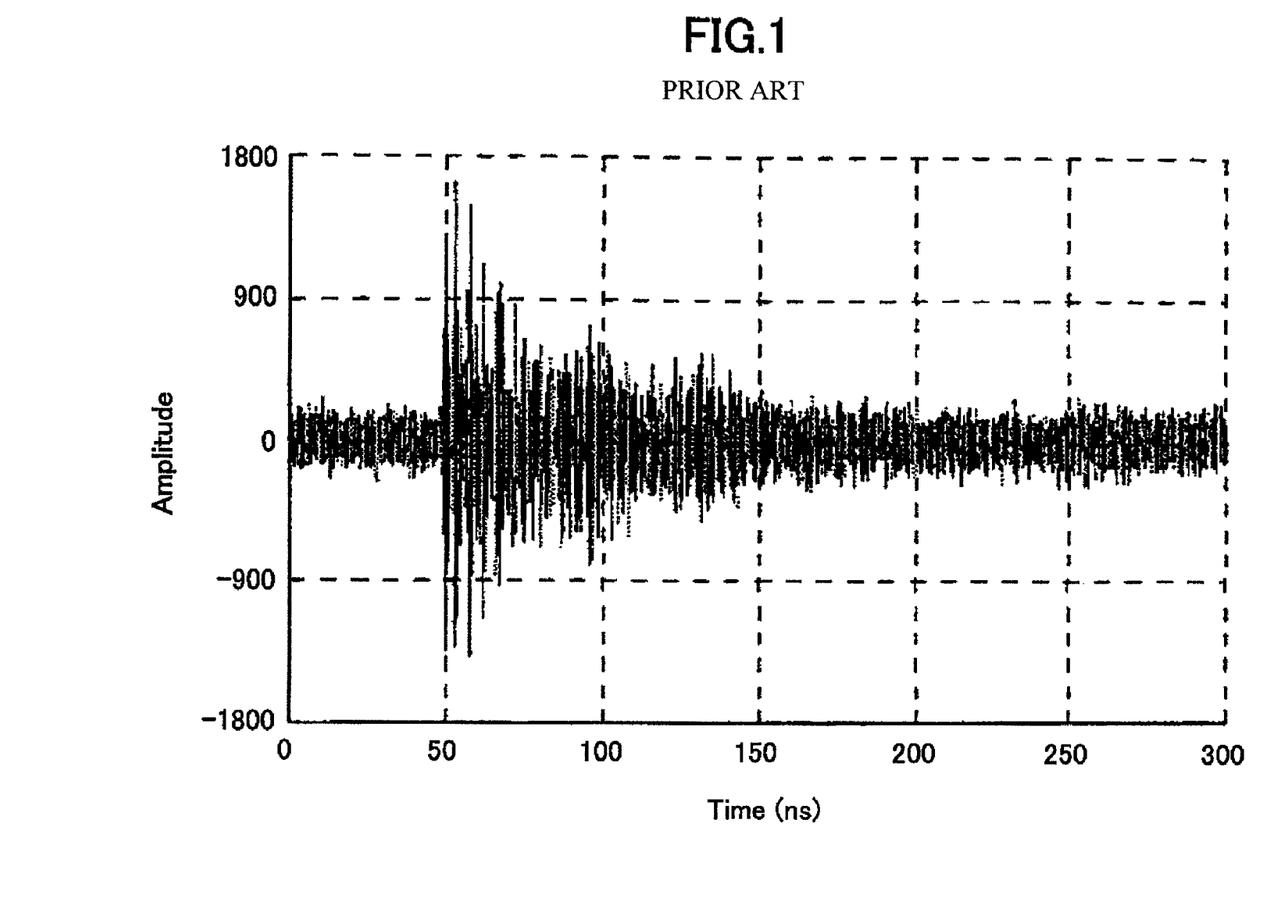
FIG. 1 is a schematic diagram illustrating exemplary relationships between backgrounds and signal profiles in a wideband radio communication system.

FIG. 1 shows an exemplary propagation delay profile in a wideband radio communication system. In FIG. 1, the horizontal axis represents time (ns), and the vertical axis represents amplitude.

As seen in FIG. 1, multipaths with higher levels of reception power are observed in the range from 50 ns to 60 ns. These multipaths with higher reception levels interfere with each other, which may cause lower accuracy of channel estimation and data demodulation.

Figure 2:
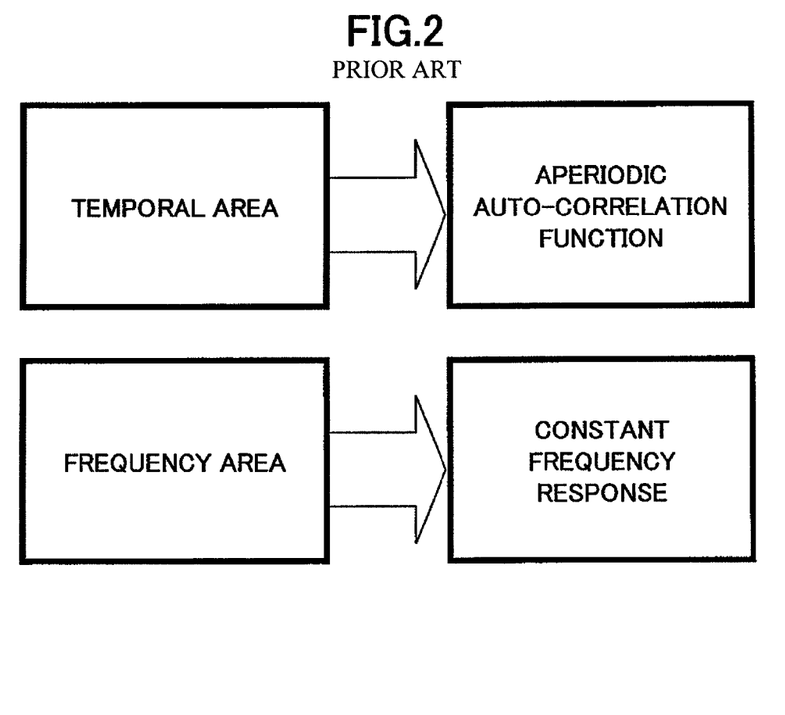
FIG. 2 is a schematic diagram illustrating preferable codes for pilot channels.

A preferred coding of pilot channels is described with reference to FIG. 2.

For temporal areas, if the auto-correlation of received pilot signals is derived, it is desired that peak codes be detected in synchronization with respective timings and non-peak codes be detected out of synchronization. Such codes may be codes with auto-correlation characteristics, for example.

Also, for frequency areas, it is desirable that the auto-correlation characteristics are flat. In other words, supposing that the horizontal axis represents frequency and the vertical axis represents auto-correlation values, it is desirable that functions with constant auto-correlation values be used. On the contrary, if the auto-correlation value may vary considerably with respect to the frequency, some influence may occur due to noise or other factors. In other words, there are two frequency areas; a higher channel estimation accuracy is achieved in one frequency area, and a lower channel estimation accuracy is achieved in the other frequency area. In the frequency area with the lower channel estimation accuracy, some influence may occur due to noise, interference or other factors.

Some cases of code evaluation in the temporal areas are described below.

In general, Merit Factor (MF) of Golay is used as evaluation values for evaluating codes.

The MF is described below.

A complex sequence u is defined as $u=(u_0, u_1, u_{N-1})$ wherein N is the length (or the cycle) of the sequence u. Here, the auto-correlation function (ACF) of the sequence u is defined by the formula (1);

$$\hat{C}_{u,u}(\tau) = \sum_{t=0}^{N-1-\tau} u(t)u*(t+\tau). \quad (1)$$

In this auto-correlation function, for a certain sequence u, the complex conjugate values are computed for the sequence u time-sifted by $\tau$. In such an auto-correlation function, it is desirable that peaks be detected in $\tau=0$ and no peak exist in greater shifts.

Also, MF for the sequence u is defined by the formula (2);

$$MF = \frac{\hat{C}_{u,u}(0)^2}{2\sum_{\tau=1}^{N-1}\hat{C}_{u,u}(\tau)^2} = \frac{N^2}{2\sum_{\tau=1}^{N-1}\hat{C}_{u,u}(\tau)^2}. \quad (2)$$

The MF may be one of standard evaluation criteria for evaluating characteristics of codes. The above function computes the sum of auto-correlation values for propagation delay amounts. In this case, the auto-correlation values for the propagation delay amounts are computed with uniform weighting.

Non patent document 1: D. C. Chu "Polyphase Codes With Good Periodic Correlation Properties," IEEE Trans. Inform. Theory, vol. 18, no. 4, pp. 531-532, July 1972.

Non patent document 2: Cohen, M. N., Fox, M. R., and Banden, M., "Minimum peak sidelobe pulse compression codes," Proc. IEEE Int. Radar Conf., 1990, pp. 633-638.

Non patent document 34; IEICE Technical Report vol. 105, RCS2005-215, pp. 223-227.

DISCLOSURE OF INVENTION

Problem To Be Solved By The Invention

However, there are some problems in the above-mentioned prior art as presented below.

In practical environments, the level of power for each path in a multipath may be lower for long propagation delay time than for short propagation delay time.

Figure 3:
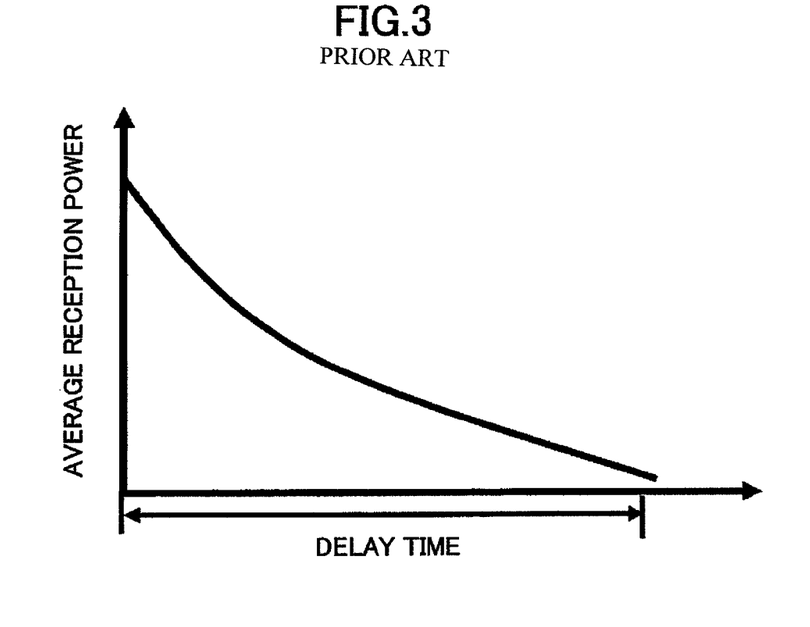
FIG. 3 is a schematic diagram illustrating exemplary relationship between delay time and average reception power.

In other words, as illustrated in a graph in FIG. 3 where the horizontal axis represents delay time and the vertical axis represents average reception power, the longer the delay time is, the lower the average reception power is.

For the MF, however, the auto-correlation values for propagation delay amounts are computed with the same weighting, and thus smaller influence on the multipath caused by the above-mentioned longer delay time is not reflected.

As one example, it is supposed and described that two codes, code 1 and code 2, each has the sequence length of 9.

Figure 4:
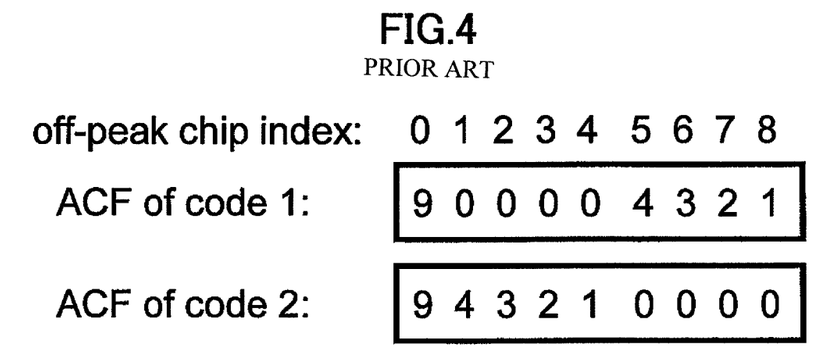
FIG. 4 is a schematic diagram illustrating exemplary evaluation criteria.

As illustrated in FIG. 4, if chip shift (off-peak chip indices) ranges from 0 to 8 in computation of the auto-correlation values of codes, the respective auto-correlation values of code 1 are 9, 0, 0, 0, 0, 4, 3, 2, 1, and the respective auto-correlation values of code 2 are 9, 4, 3, 2, 1, 0, 0, 0, 0.

Hence, if there is no chip shift, both the codes have the auto-correlation value of 9. If there is a one-chip shift, the auto-correlation values of code 1 and code 2 are equal to 0 and 4, respectively. If there is a two-chip shift, the auto-correlation values of code 1 and code 2 are equal to 0 and 3, respectively. If there is a three-chip shift, the auto-correlation values of code 1 and code 2 are equal to 0 and 2, respectively. If there is a four-chip shift, the auto-correlation values of code 1 and code 2 are equal to 0 and 1, respectively. If there is a five-chip shift, the auto-correlation values of code 1 and code 2 are equal to 4 and 0, respectively. If there is a six-chip shift, the auto-correlation values of code 1 and code 2 are equal to 3 and 0, respectively. If there is a seven-chip shift, the auto-correlation values of code 1 and code 2 are equal to 2 and 0, respectively. If there is an eight-chip shift, the auto-correlation values of code 1 and code 2 are equal to 1 and 0, respectively.

In this case, the MFs of both codes are computed with the formula (2), and the resulting MFs have the same value of 1.35 (=9×9/(2×(4×4+3×3+2×2+1))).

From the viewpoint of antimultipath characteristics, however, code 1 is preferred in that it has the smaller auto-correlation value under the condition of smaller chip shift, and thus it cannot be determined from the comparison of the MFs which of the codes is better.

Accordingly, the present invention addresses the above-mentioned problems. One object of the present invention is to provide a code evaluator and a code evaluation method enabling codes to be evaluated in consideration of general conditions of radio transmission paths as well as a radio communication system, a base station and a mobile station that use a code sequence selected based on the code evaluation method.

MEANS FOR SOLVING THE PROBLEM

In order to overcome the above-mentioned problems, an embodiment of the present invention relates to a code evaluator, comprising an evaluation reference value computation unit computing an evaluation reference value for determining quality of a generated code based on an auto-correlation function derived from the generated code and a weighting factor determined depending on propagation delay time; and a determination unit determining the quality of the generated code based on the evaluation reference value.

According to this embodiment, different weightings are applied depending on propagation delay time, and evaluation reference values can be computed for determining quality of codes.

In addition, another embodiment of the present invention relates to a method of evaluating a code, comprising the steps of computing an auto-correlation function from a generated code; computing an evaluation reference value for determining quality of the generated code based on the auto-correlation function and a weighting factor determined depending on the evaluation reference value; and determining the quality of the generated code based on the evaluation reference value.

According to this embodiment, different weightings are applied depending on propagation delay time, and evaluation reference values can be computed for determining quality of codes.

Further, another embodiment of the present invention relates to a radio communication system wherein the code sequence selected based on the above-mentioned method is used as a pilot channel pattern.

According to this embodiment, a code sequence selected based on the above-mentioned evaluation reference value can be used as a pilot channel pattern.

Still further, another embodiment of the present invention relates to a base station, comprising a pilot channel assignment unit dividing a code sequence selected based on the above-mentioned method into multiple sequences, shifting the divided sequences, generating a pattern of multiple pilot channels and assigning the pilot channels to individual mobile stations.

According to this embodiment, it is possible to divide a code sequence selected based on the above-mentioned evaluation reference value into multiple sequences, shift the divided sequences, generate a pattern of multiple pilot channels and assign the pilot channels to individual mobile stations.

Still further, another embodiment of the present invention relates to a mobile station, comprising a pilot channel generation unit dividing a code sequence selected based on the method as claimed in claim 6 into multiple sequences, shifting the divided sequences and generating a pattern of pilot channels, the pilot channel generation unit selecting the shift amount in accordance with a control signal associated with the shift amount transmitted from a base station or information indicative of the shift amount stored in advance.

According to this embodiment, it is possible to divide a code sequence selected based on the above-mentioned evaluation reference value into multiple sequences, shift the divided sequences and generate a pattern of multiple pilot channels.

ADVANTAGE OF THE INVENTION

According to the embodiments of the present invention, a code evaluator and a code evaluation method are provided for enabling codes to be evaluated in consideration of general conditions of radio transmission paths. Also, a radio communication system, a base station and a mobile station using a code sequence selected based on the code evaluation method can be achieved.

LIST OF REFERENCE SYMBOLS

100: code evaluator
200: mobile station
300: base station
400: radio communication system

BEST MODE FOR CARRYING OUT THE INVENTION

Embodiments of the present invention will be described in detail with reference to the accompanying drawings below. Throughout the drawings, identical reference symbols are used for elements having the same functions, and descriptions thereof are not repeated.

Figure 5:
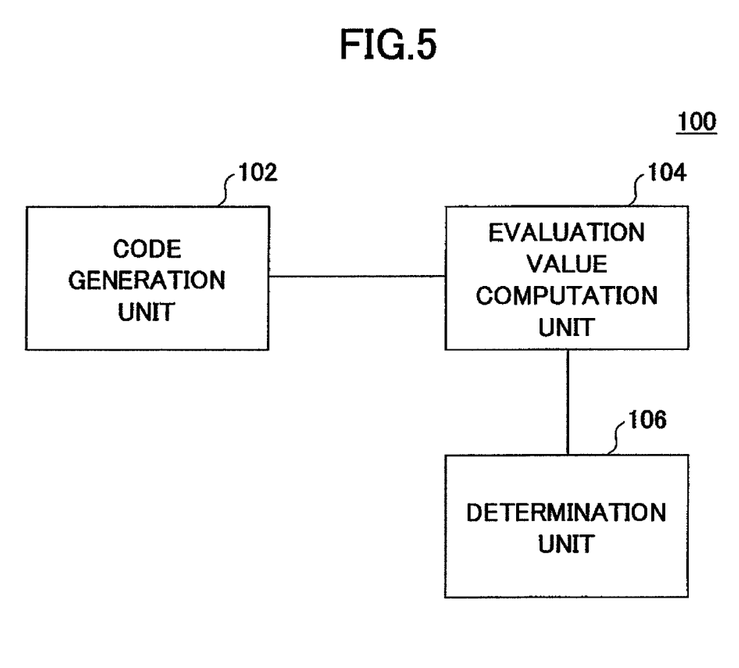
FIG. 5 is a block diagram illustrating a code evaluator according to one embodiment of the present invention.

A code evaluator according to one embodiment of the present invention is described with reference to FIG. 5.

In this embodiment, the code evaluator 100 includes a code generation unit 102, an evaluation value computation unit 104 receiving output signals of the code generation unit 102, and a determination unit 106 receiving output signals of the evaluation value computation unit 104.

The code generation unit 102 generates codes for evaluation. For example, the code generation unit 102 may generate CAZAC codes (see non-patent document 1), Golay codes (see non-patent document 2) and/or AGA codes (see non-patent document 3) as the codes for evaluation. The code generation unit 102 may generate other codes.

The evaluation value computation unit 104 uses the codes for evaluation to compute evaluation reference values. For example, the evaluation value computation unit 104 uses the formula (3) to compute the evaluation reference values;

$$AMF = \frac{N^2}{2\left(\frac{N-1}{L}\right)\sum_{\tau=1}^{L-1} \text{ratio}(\tau) \cdot \hat{C}_{u,u}(\tau)^2)} \quad (3)$$

In the formula (3), L is a parameter specific to the radio communication system and may depend on chip rate and/or carrier frequency, for example. In general, as delay spread of multipath signals is larger in a radio communication system, the greater L must be considered.

In general, L is less than or equal to N. In general, the length of the maximum delay spread is less than the length of multipath signals.

In the formula (3), ratio ($\tau$) is a weighting factor. Also, $\tau$ is propagation delay time. There are various methods for selecting weighting of auto-correlation functions. In a radio transmission environment, multipath signals with longer propagation delay time have lower reception power than multipath signals with shorter propagation delay time. Thus, higher weights are applied to the multipath signals with the shorter propagation delay time while lower weights are applied to the multipath signals with the longer propagation delay time. For example, the weighting factors, which are represented by vectors r, can be implemented in linear weighting or weighting attenuated by multiplication with negative values. The weighting factors depend on the system, the chip rate and/or the carrier frequency.

Exemplary computation of the evaluation reference values is described.

In this embodiment, the evaluation reference values are computed for the above-mentioned code 1 and code 2. In other words, as described with reference to FIG. 4, for the off-peak chip indices 0-8, the auto-correlation values for code 1 are 9, 0, 0, 0, 0, 4, 3, 2, 1, respectively, and the auto-correlation values for code 2 are 9, 4, 3, 2, 1, 0, 0, 0, 0, respectively.

In this case, the sequence length N is equal to 9.

Here, the formula (4) is defined as the weighting factors;

vector r=ratio(1: $N$−1)=(ratio(1), ratio(2), . . . , ratio ($N$−1))=($N$−1, $N$−2, . . . , 2, 1)·(1/mean($N$−1, $N$−2, . . . , 2, 1)) (4)

For example, an embodiment where ratios are equal to 8, 7, 6, 5, 4, 3, 2, 1 is described.

In this embodiment, vector r=(8, 7, 6, 5, 4, 3, 2, 1)·(1/mean (8, 7, 6, 5, 4, 3, 2, 1))=(1.7778, 1.5556, 1.3333, 1.1111, 0.8889, 0.6667, 0.4444, 0.2222). Here, it is supposed that L=N−1.

In this case, the evaluation reference value for code 1 is expressed as the formula (5);

evaluation reference value for code 1=(9×9/2×(0+0+ 0+0+0.889×4×4+0.6667×3×3+0.4444×2×2+0.2222×1×1)=4.6535 (5)

Also, the evaluation reference value for code 2 is expressed as the formula (6);

evaluation reference value for code 2=(9×9/2× (1.7778×4×4+1.5556×3×3+1.3333×2×2+1.111× 1×1+0+0+0+0))=1.0038 (6).

The determination unit 106 determines based on the evaluation reference values computed in the evaluation value computation unit 104 whether codes corresponding to the evaluation reference values can be used in the radio communication system.

For example, the determination unit 106 predefines thresholds for the evaluation reference values based on evaluation indicators such as multipath delay spreading, transmission environments and delay spread. Also, the determination unit 106 determines whether the evaluation reference values computed in the evaluation value computation unit 104 are greater than or equal to the thresholds. If the evaluation reference values are greater than or equal to the thresholds, the determination unit 106 determines that the codes can be used. On the other hand, if the evaluation reference values are less than or equal to the thresholds, the determination unit 106 determines that the codes cannot be used.

Figure 6:
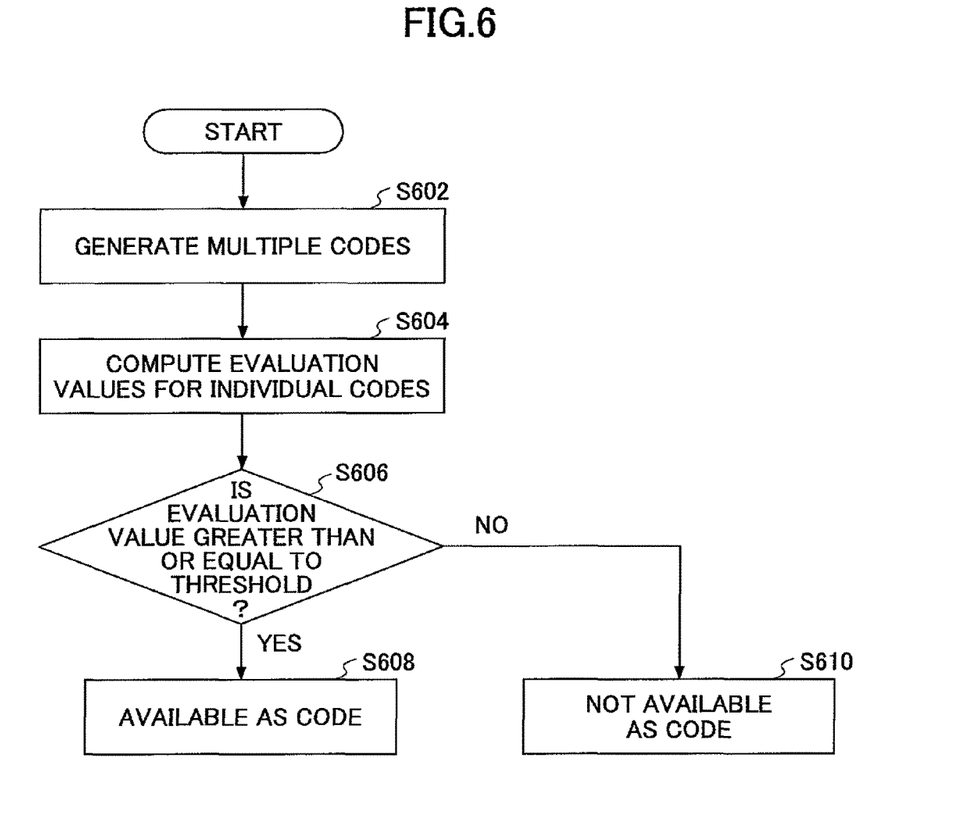
FIG. 6 is a flow diagram illustrating a code evaluation method according to one embodiment of the present invention.

Next, a code evaluation method according to one embodiment of the present invention is described with reference to FIG. 6.

The code generation unit 102 generates codes for evaluation. At step S602, the code generation unit 102 generates CAZAC codes, Golay codes and/or AGA codes as the codes for evaluation, for example.

Then, at step S604, the evaluation value computation unit 104 uses the codes for evaluation to compute the evaluation reference values.

For example, supposing that the sequence length of the codes is N, a parameter specific to the radio communication system is L, the weighting factor is ratio ($\tau$) and propagation delay time is $\tau$, the evaluation value computation unit 104 computes auto-correlation functions in accordance with the formula (1) and computes the evaluation reference values in accordance with the formula (3).

Then, at step S606, the determination unit 106 determines whether the evaluation reference values computed in the evaluation value computation unit 104 are greater than or equal to the predefined thresholds.

If the evaluation reference values are greater than or equal to the thresholds (step S606: YES), at step S608, the determination unit 106 determines that the generated codes can be used.

On the other hand, if the evaluation reference values are less than or equal to the thresholds (step S606: NO), at step S610, the determination unit 106 determines that the generated codes cannot be used.

Next, exemplary relationship between chip shifts and evaluation reference values are described with reference to FIG. 7.

Figure 7:
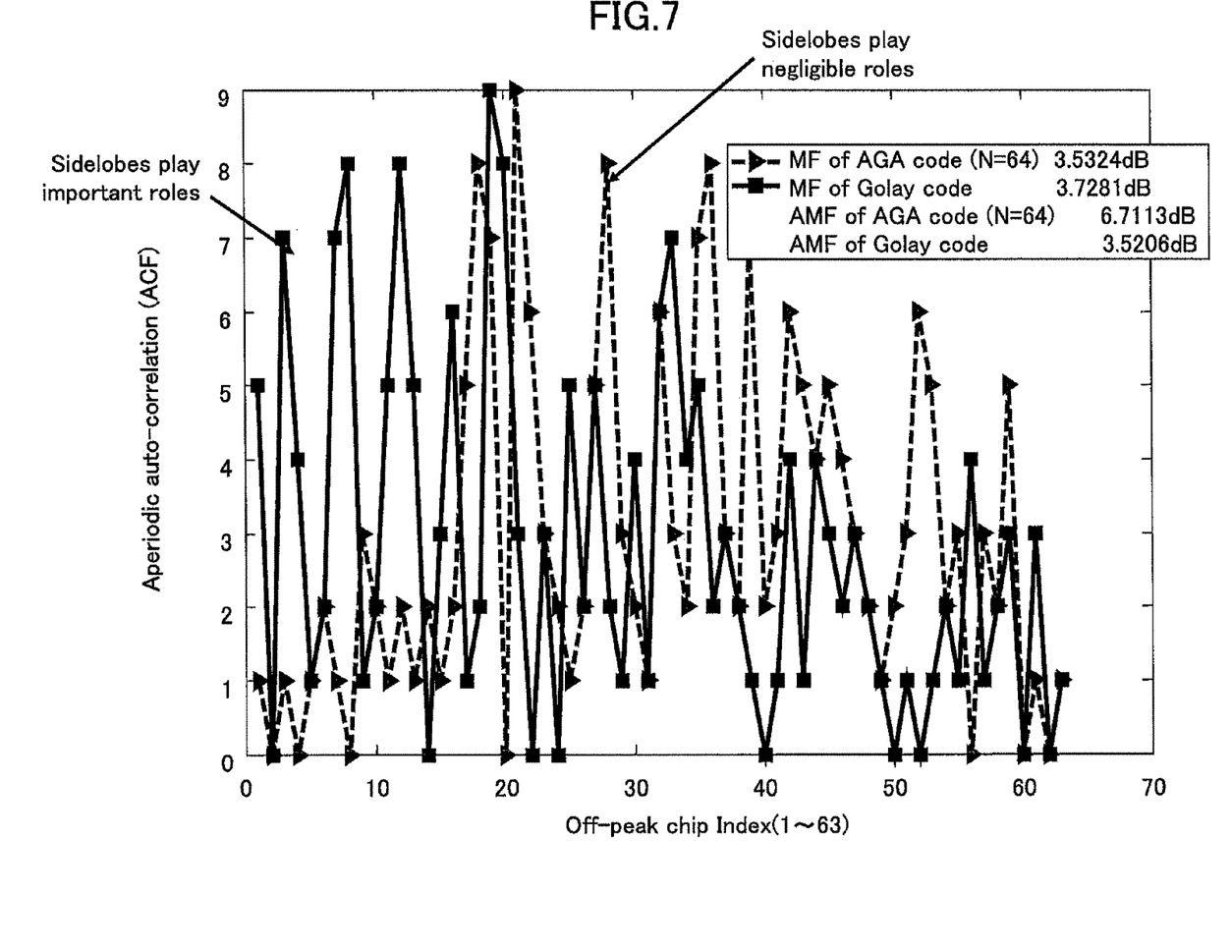
FIG. 7 is a schematic diagram illustrating an exemplary comparison between AGA codes and Golay codes for ACF.

In FIG. 7, the horizontal axis represents the off-peak chip index, and the vertical axis represents the evaluation reference value. Also, in the illustrated embodiment in FIG. 7, AGA codes and Golay codes are used as codes for evaluation. Then, two cases where the formulae (2) and (3) are used as the evaluation functions are illustrated.

It is supposed that the delay spreading of multipath is approximately 23 chip shifts and the multipath is in the range of about 6 μs. Thus, comparison between the two cases is made in the range of about 23 chips. In this range, the AGA codes may have entirely smaller values.

In the case where the conventional evaluation function (2) is used for computation, the evaluation value for the AGA codes is equal to. 3.5324 dB while the evaluation value for the Golay codes is equal to 3.7281 dB, which are not substantially different from each other.

In the case where the evaluation function (3) according to this embodiment is used for computation, however, the evaluation reference value for the AGA codes is equal to 6.7113 dB while the evaluation reference value for the Golay codes is equal to 3.5206 dB. Thus, it can be obviously concluded that the AGA codes have better characteristics.

In the AGA codes, the peak of the auto-correlation is reduced in the interval with greater multipath delay spreading, that is, in the interval of about 23-chip shift compared to the Golay codes. As a result, it can be concluded that the AGA codes are better.

Thus, codes with better characteristics can be selected by using the evaluation function according to this embodiment to evaluate the evaluation reference values for codes.

Next, exemplary comparison between CAZAC codes and AGA codes is described with reference to FIG. 8.

Similar to the illustration in FIG. 7, the comparison is made in the range of about 23 chips.

In the case where the conventional evaluation function (2) is used for computation, the evaluation value for the AGA codes is equal to 4.2578 dB while the evaluation value for the CAZAC codes is equal to 12.5327 dB. Thus, it can be concluded that the CAZAC codes are better.

In the case where the evaluation function (3) according to this embodiment is used for computation, the evaluation reference value for the AGA codes is equal to 10.1082 dB while the evaluation reference value for the CAZAC codes is equal to 8.3657 dB. Thus, it can be obviously concluded that the AGA codes have better characteristics.

Figure 8:
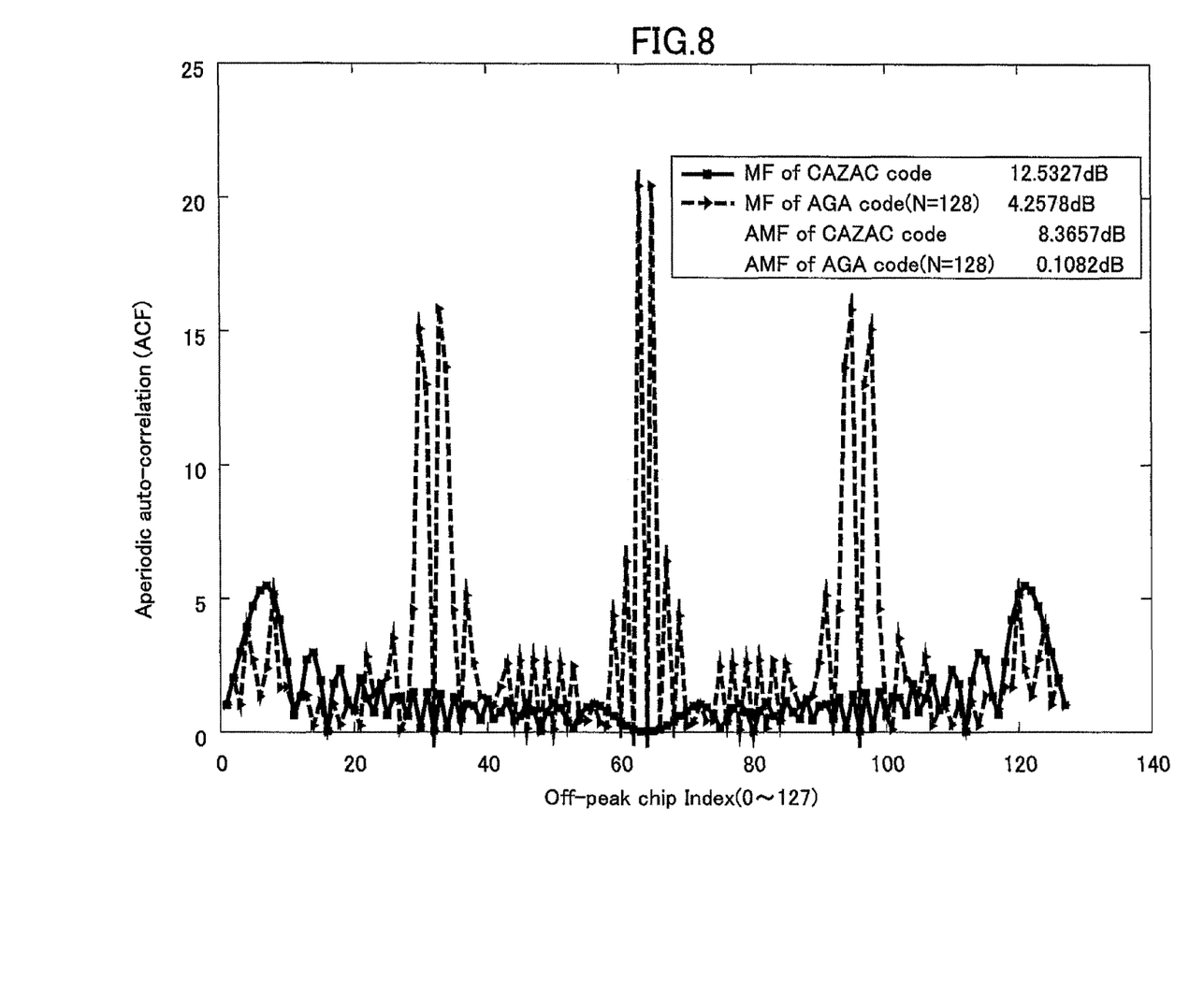
FIG. 8 is a schematic diagram illustrating an exemplary comparison between AGA codes and CAZAC codes for ACF.

For the AGA codes, as shown in FIG. 8, the peak of the auto-correlation occurs in the range with larger chip shifts, but the peak of the auto-correlation is reduced in the interval of greater multipath delay spreading, that is, in the interval of about 23-chips shift compared to the CAZAC codes. Thus, it can be concluded that the AGA codes are better.

Thus, codes with better characteristics can be selected by using the evaluation function according to this embodiment to evaluate codes.

In fact, it is difficult to determine by only the comparison of the auto-correlation whether codes are better. Finally, the evaluation is performed based on comparison of the bit error rate.

Figure 9:
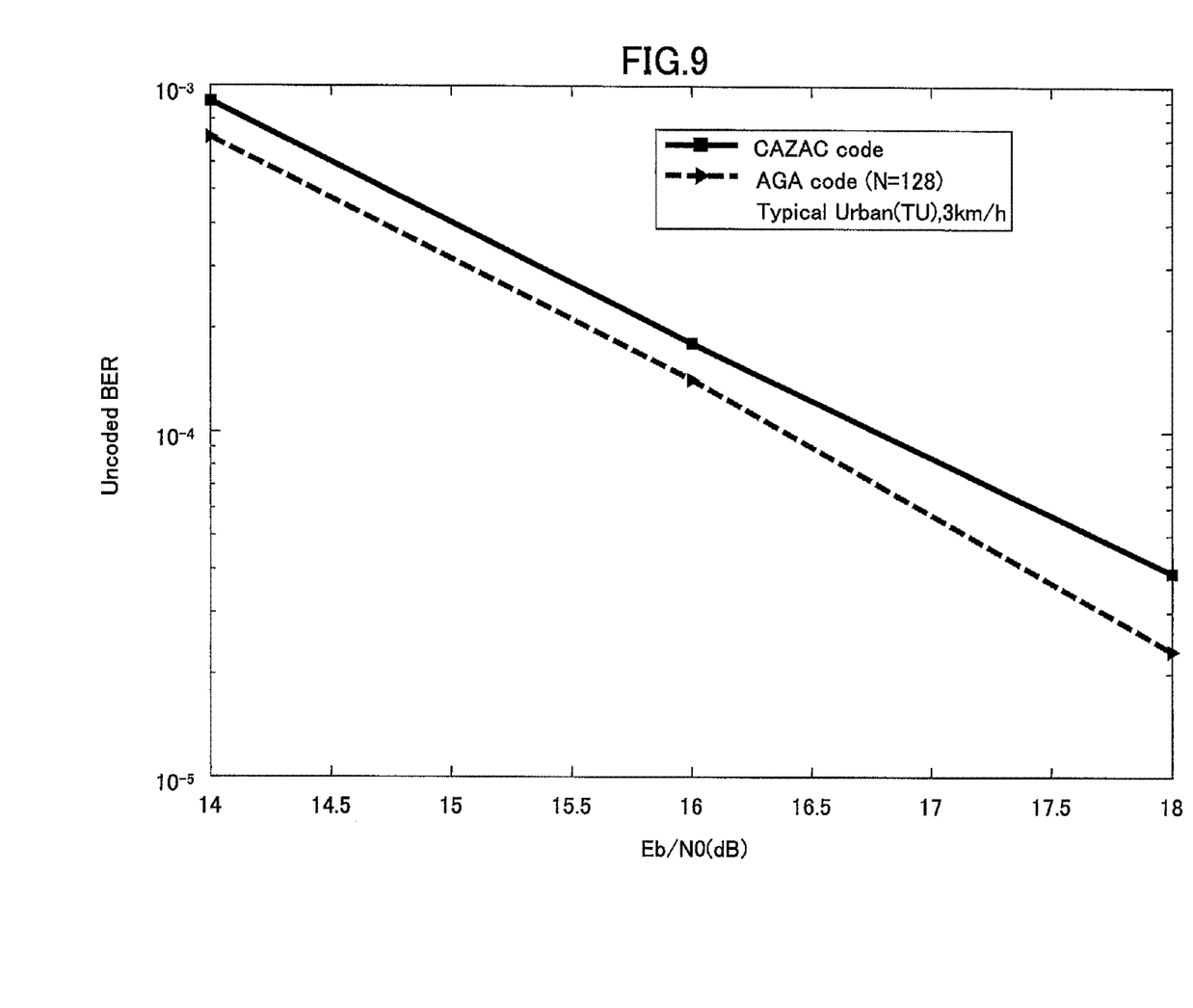
FIG. 9 is a schematic diagram illustrating uncoded BER for $E_b/N_0$ in TU.
Figure 10:
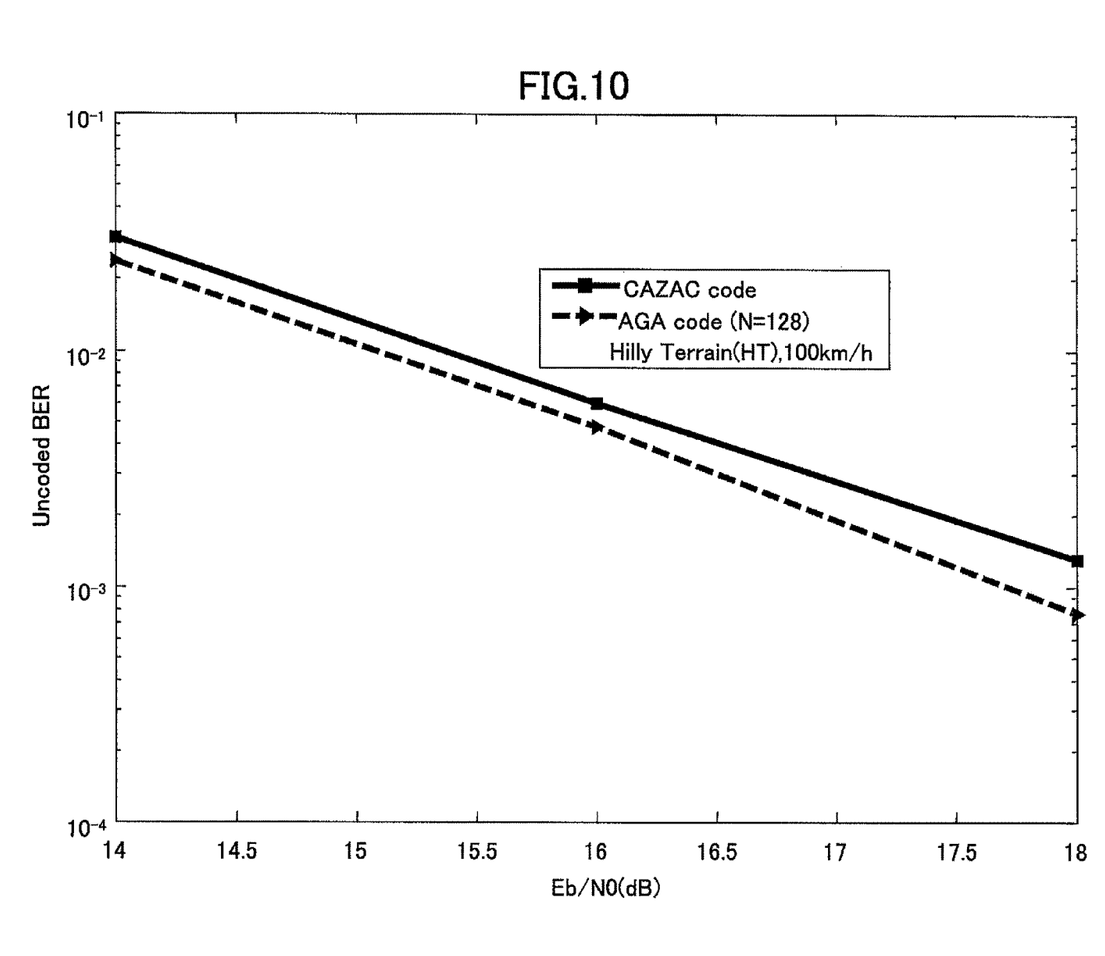
FIG. 10 is a schematic diagram illustrating uncoded BER for $E_b/N_0$ in HT.

In FIGS. 9 and 10, exemplary comparison between CAZAC codes and AGA codes are illustrated. In FIGS. 9 and 10, the horizontal axis represents $E_b/N_0$ (dB), and the vertical axis represents the bit error rate (unicoded BER). Also, a Typical Urban (TU) channel model is supposed in FIG. 9, and a Hilly Terrain (HT) channel model is supposed in FIG. 10.

In the embodiments in FIGS. 9 and 10, the error rate for the AGA codes can be more significantly reduced than the CAZAC codes under the same $E_b/N_0$. In other words, it can be concluded that better characteristics can be obtained for the AGA codes.

Next, a radio communication system and a base station are described where code sequences selected based on the above-mentioned code evaluation method are used.

A radio communication system 400 includes a base station 300 and a mobile station 200. In the radio communication system 400, code sequences selected based on the above-mentioned code evaluation method are used as pilot channel patterns.

The base station 300 assigns codes selected based on the evaluation function for mobile stations 200.

Figure 11:
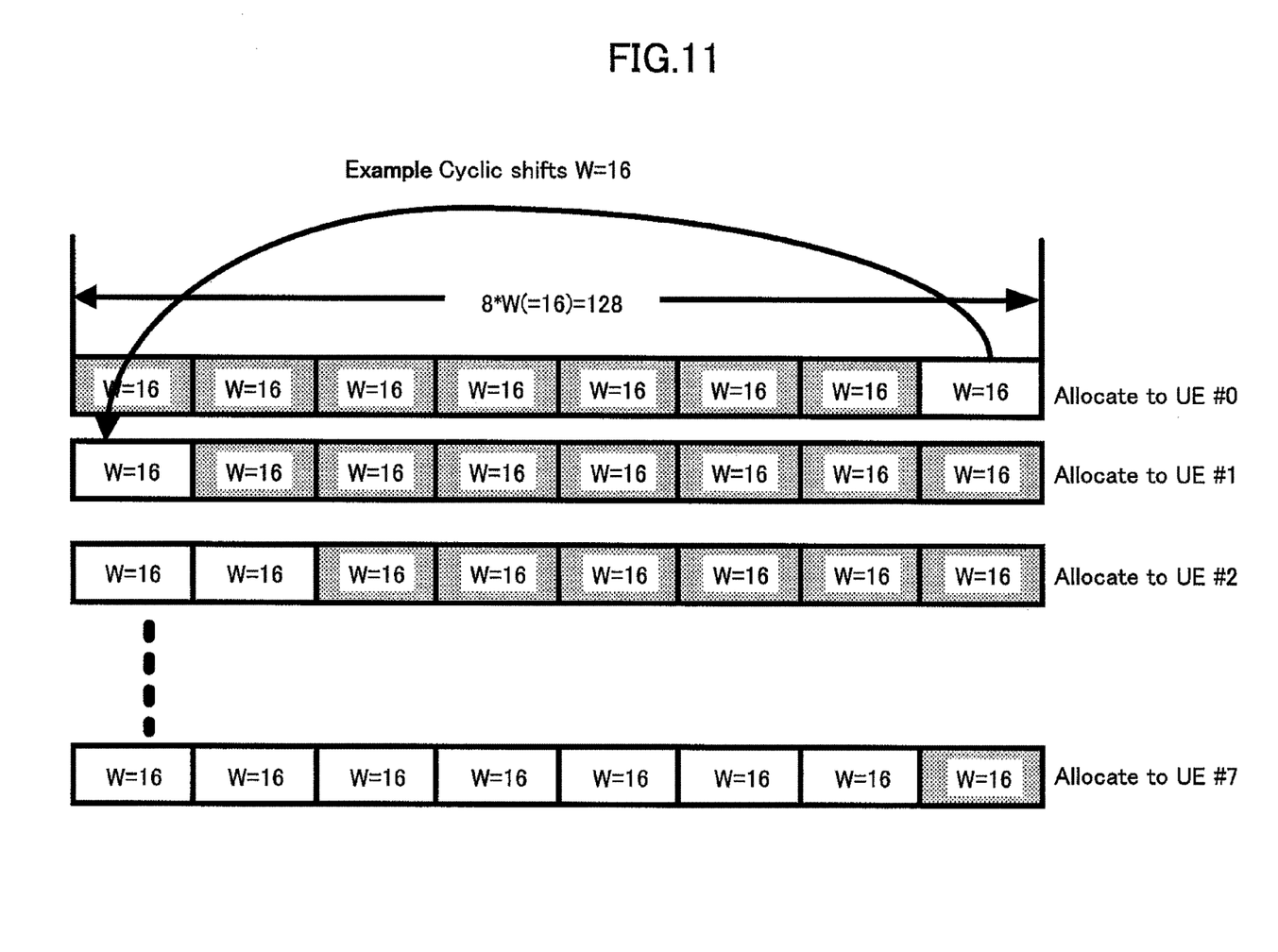
FIG. 11 is a schematic diagram illustrating exemplary assignment of a code sequence to a mobile station.

For example, as illustrated in FIG. 11, the base station 300 assigns selected 128-chip codes for the mobile station #0 (UE#0). In FIG. 11, W is the amount of cyclic shift and is equal to 16, for example. Also, the base station 300 allocates and assigns the last codes with W=16 chips of the codes assigned for the UE#1 to the head of the mobile station #1 (UE#1). Also, the base station 300 allocates and transmits the last codes with W=16 chips of the codes assigned for the UE#1 to the head of the mobile station #2 (UE#2), and so on. Similarly, the base station 300 allocates and assigns the last codes with W=16 chips of the codes assigned for the UE#6 to the head of the mobile station #7 (UE#7) Specifically, the base station 300 divides a selected code sequence into multiple sequences, shifts the divided sequences, generates a pattern of multiple pilot channels and assigns the pilot channels for individual mobile stations.

If W is greater than the maximum delay time of multipath, multipath signals from the mobile stations can be identified with high accuracy because of orthogonality. In this fashion, more pilot channel patterns can be assigned for the mobile stations.

As mentioned above, if codes are assigned for the mobile stations, the shift amount may be transmitted from the base station to the mobile stations. Alternatively, the base station and the mobile stations both share a common reference table of the shift amounts, and the mobile stations may select and transmit the shift amount.

Figure 12:
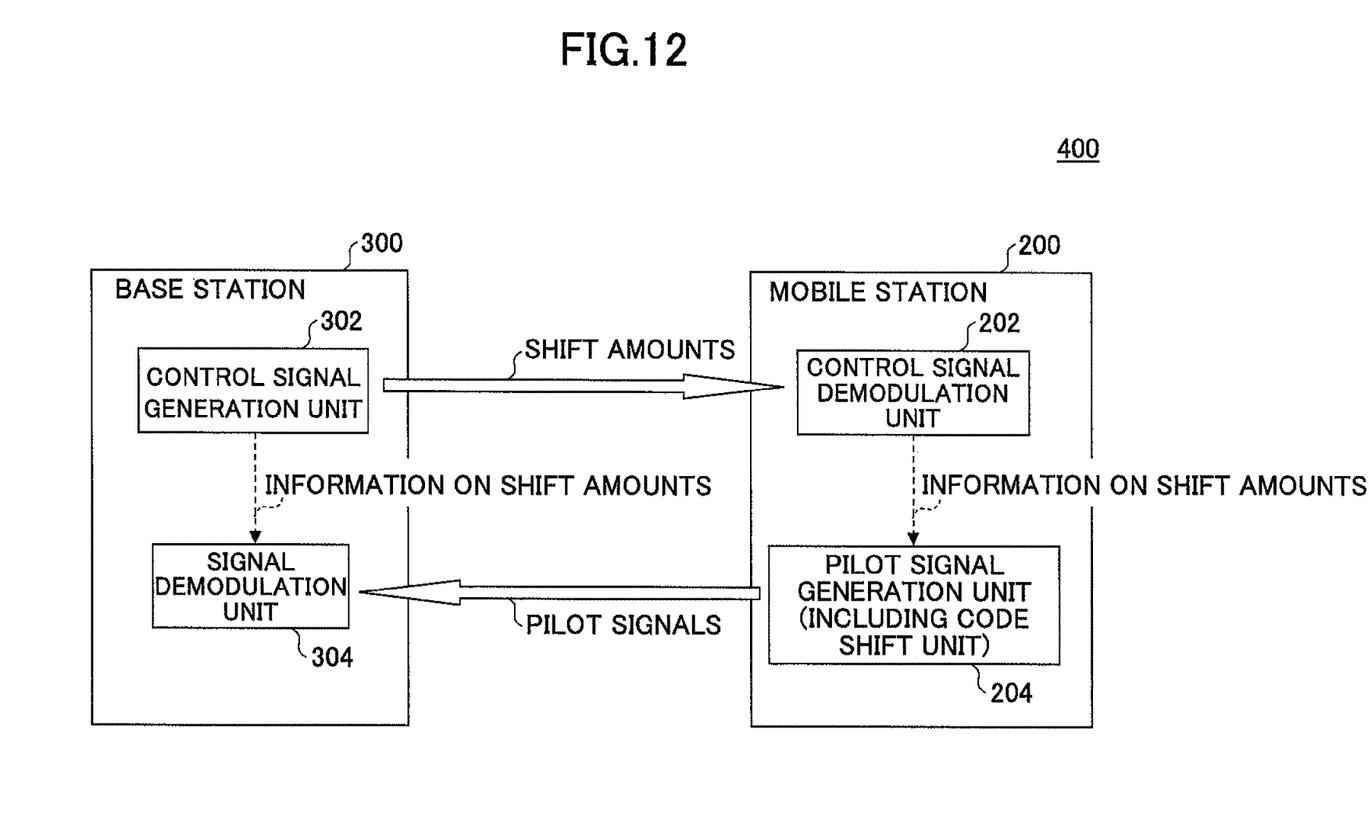
FIG. 12 is a schematic diagram illustrating a radio communication system according to one embodiment of the present invention.

An exemplary case where the shift amount is transmitted from the base station to the mobile station is described with reference to FIG. 12.

In this embodiment, the base station 300 includes a control signal generation unit 302 and a signal demodulation unit 304 receiving output signals of the control signal generation unit 302.

The base station 300 divides a selected code sequence into multiple sequences, shifts the divided sequences, generates a pattern of multiple pilot channels and assigns the pilot channels for individual mobile stations.

The control signal generation unit 302 generates control signals for the shift amount and reports the shift amount to the mobile station 200. For example, the control signal generation unit 302 uses downlink control signals to report the shift amount of the mobile station 200. Also, the control signal generation unit 302 supplies information on the shift amount to the signal demodulation unit 304.

The signal demodulation unit 304 demodulates the signals transmitted from the mobile station 200 based on the reported shift amount.

The mobile station 200 includes a control signal demodulation unit 202 and a pilot signal generation unit 204 receiving output signals of the control signal demodulation unit 202.

The control signal demodulation unit 202 demodulates control signals for the shift amounts transmitted from the base station 100. Also, the control signal demodulation unit 202 supplies information on the shift amounts extracted from the demodulated control signals to the pilot signal generation unit 204.

The pilot signal generation unit 204 includes a code shift unit and generates pilot signals based on the reported shift amounts. For example, the pilot signal generation unit 204 divides a selected code sequence into multiple sequences, shifts the divided sequences by the demodulated shift amounts and generates a pattern of pilot channels. Also, the pilot signal generation unit 204 transmits the generated pilot signals in uplinks.

Figure 13:
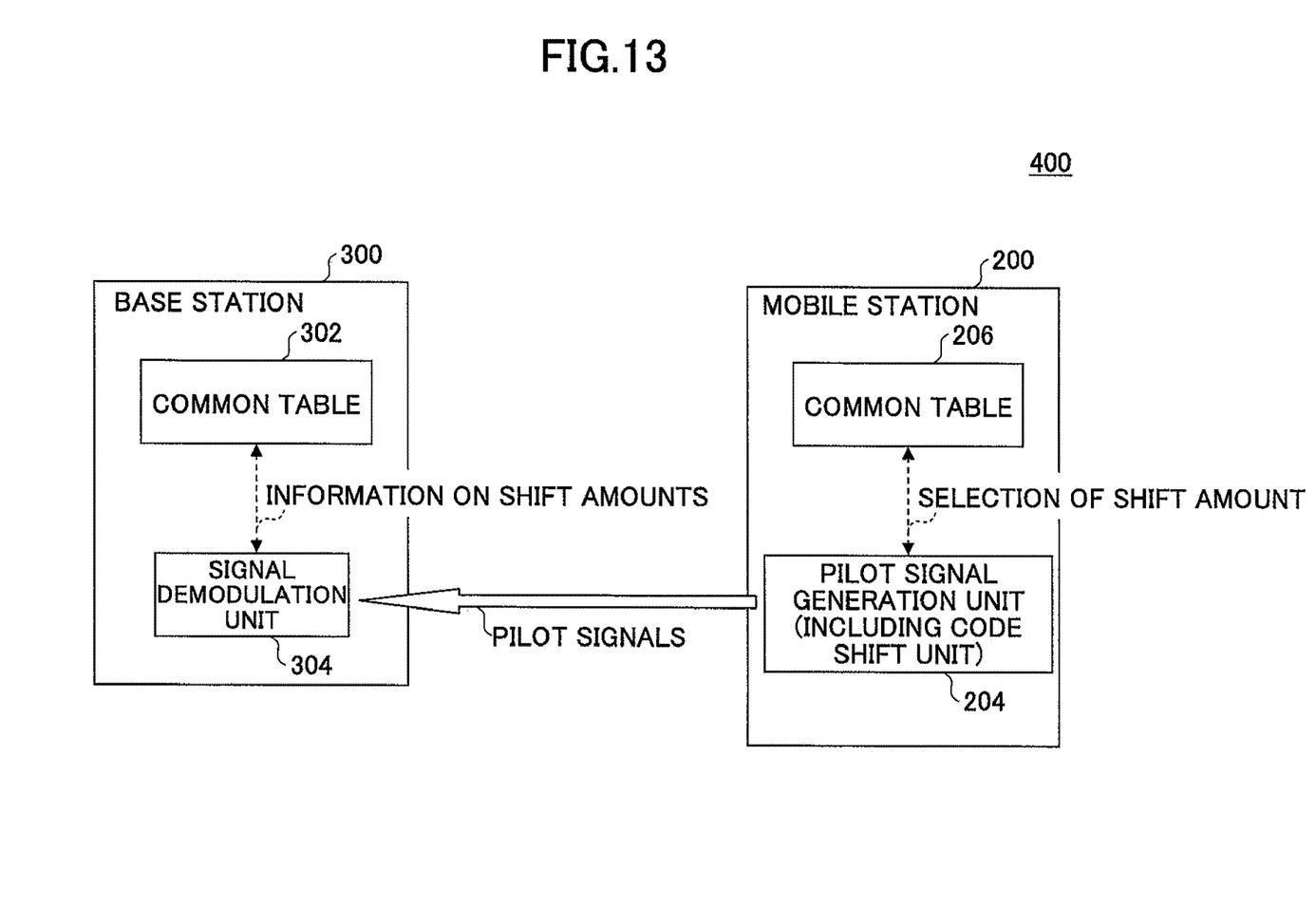
FIG. 13 is a schematic diagram illustrating a radio communication system according to one embodiment of the present invention.

Next, an exemplary case is described with reference to FIG. 13 where the base station 300 and the mobile station 200 share a common reference table of the shift amounts and the mobile station 200 selects and transmits the shift amount.

In this case, the base station 100 includes a common table 106 and a signal demodulation unit 104 connected to the common table 106.

The common table 106 stores information on the shift amounts therein.

The signal demodulation unit 104 searches the common table 106 for the shift amount selected by the mobile station 200 and demodulates pilot signals from the mobile station 200 based on the shift amount. For example, the signal demodulation unit 104 searches the common table 106 based on identifiers for indicating the shift amounts in the pilot signals in order to identify the shift amounts.

The mobile station 200 includes a common table 206 and a pilot signal generation unit 204 connected to the common table 206.

The common table 206 stores information on the shift amounts therein.

The pilot signal generation unit 204 includes a code shift unit and selects one of the shift amounts stored in the common table 206 to generate a pilot signal. For example, the pilot signal generation unit 204 divides a selected code sequence into multiple sequences, shifts the divided sequences by the selected shift amount and generates a pilot channel pattern. The pilot signal generation unit 204 transmits the pilot signal generated based on the selected shift amount in uplinks.

For example, the common table 206 stores the shift amounts and identifiers associated with the shift amounts therein. The pilot signal generation unit 204 stores and transmits the identifier corresponding to the selected shift amount in a pilot signal.

This international patent application is based on Japanese Priority Application No. 2006-077815 filed on Mar. 20, 2006, the entire contents of which are hereby incorporated by reference.

INDUSTRIAL APPLICABILITY

The code evaluator and the code evaluation method according to the present invention as well as the radio communication system, the base station and the mobile station using code sequences selected based on the code evaluation method can be applied to radio communication systems.

The invention claimed is:

1. A code evaluator, comprising:
an evaluation reference value computation unit computing an evaluation reference value for determining quality of a generated code based on an auto-correlation function derived from the generated code and a weighting factor determined depending on propagation delay time; and
a determination unit determining the quality of the generated code based on the evaluation reference value.

2. The code evaluator as claimed in claim 1, wherein the evaluation reference value computation unit applies a higher weighting factor to an auto-correlation function corresponding to a multipath signal with less propagation delay time and a lower weighting factor to an auto-correlation function corresponding to a multipath signal with greater propagation delay time.

3. The code evaluator as claimed in claim 1, wherein the weighting factor depends on at least one of a chip rate and a carrier frequency.

4. The code evaluator as claimed in claim 1, wherein the evaluation reference value computation unit computes the auto-correlation function by, and
the evaluation reference value by,
where N is a sequence length of the code, L is a parameter specific to a radio communication system, ratio($\tau$) is the weighting factor, and $\tau$ is propagation delay time.

5. The code evaluator as claimed in claim 1, wherein the determination unit determines the quality of the code based on a predefined threshold.

6. A method of evaluating a code, comprising the steps of:
computing an auto-correlation function from a generated code;
computing an evaluation reference value, using an evaluation reference value computation unit, for determining quality of the generated code based on the auto-correlation function and a weighting factor determined depending on the evaluation reference value; and
determining the quality of the generated code based on the evaluation reference value using a determination unit.

7. The method as claimed in claim 6, wherein the step of computing the evaluation reference value comprises applying a higher weighting factor to an auto-correlation function corresponding to a multipath signal with less propagation delay time and a lower weighting factor to an auto-correlation function corresponding to a multipath signal with greater propagation delay time.

8. The method as claimed in claim 6, wherein the weighting factor depends on at least one of a chip rate and a carrier frequency.

9. The method as claimed in claim 6, wherein the step of computing the evaluation reference value comprises computing the auto-correlation function by, and
the evaluation reference value by,
where N is a sequence length of the code, L is a parameter specific to a radio communication system, ratio($\tau$) is the weighting factor, and $\tau$ is propagation delay time.

10. The method as claimed in claim 6, wherein the step of determining comprises determining the quality of the code based on a predefined threshold.

11. The method as claimed in claim 6, further comprising the step of:
generating a code sequence selected based on the determination at the step of determining as a pilot channel pattern.

12. The method as claimed in claim 11, wherein the step of generating the code sequence comprises dividing the code sequence into multiple sequences, shifting the divided sequences and generating a pattern of multiple pilot channels.

13. The method as claimed in claim 12, further comprising the step of:
reporting an amount of the shift from a base station to a mobile station.

14. A radio communication system comprising:
a code evaluator;
a base station communicatively coupled to the code evaluator; and
one or more mobile stations communicatively coupled to the base station, wherein the code evaluator comprises:
an evaluation reference value computation unit computing an evaluation reference value for determining quality of a generated code based on an auto-correlation function derived for the generated code and a weighting factor determined depending on propagation delay time; and a determination unit determining the quality of the generated code based on the evaluation reference value.

* * * * *